US010098330B2

(12) United States Patent
Lockie

(10) Patent No.: US 10,098,330 B2
(45) Date of Patent: Oct. 16, 2018

(54) DESTACKING AND RESTACKING OF CONTAINERS USING A ROBOT IN POULTRY HATCHERY OPERATIONS

(71) Applicant: ZOETIS CANADA INC., Kirkland (CA)

(72) Inventor: David James Lockie, Ilderton (CA)

(73) Assignee: ZOETIS CANADA INC., Kirkland (CA)

( * ) Notice: Subject to any disclaimer, the term of this patent is extended or adjusted under 35 U.S.C. 154(b) by 0 days.

(21) Appl. No.: 14/961,009

(22) Filed: Dec. 7, 2015

(65) Prior Publication Data

US 2016/0165858 A1 Jun. 16, 2016

Related U.S. Application Data

(63) Continuation of application No. 12/864,264, filed as application No. PCT/CA2009/000078 on Jan. 23, 2009, now Pat. No. 9,232,773.

(Continued)

(51) Int. Cl.
*B65G 47/90* (2006.01)
*A01K 43/00* (2006.01)
*A01K 41/06* (2006.01)
*A01K 45/00* (2006.01)
*B65B 23/08* (2006.01)

(Continued)

(52) U.S. Cl.
CPC .......... *A01K 43/00* (2013.01); *A01K 41/065* (2013.01); *A01K 45/00* (2013.01); *B65B 23/08* (2013.01); *B65B 35/18* (2013.01); *B65G 47/90* (2013.01); *B65G 59/02* (2013.01)

(58) Field of Classification Search
USPC .......... 294/188, 65, 87.12; 414/265, 331.04, 414/401, 411, 416.07, 788.2, 788.3, 414/788.7, 788.8, 792.7, 792.8, 792.9, 414/793, 793.1, 793.2, 794.9, 795, 795.3, 414/795.6, 795.8, 796.5, 796.9, 797, 414/797.1, 797.4, 797.7, 798.4, 799, 801, 414/802, 924, 927
See application file for complete search history.

(56) References Cited

U.S. PATENT DOCUMENTS 2,598,222 A * 5/1952 Cahners ................. B65G 57/24
414/560
3,506,140 A 4/1970 Koch et al.
(Continued)

FOREIGN PATENT DOCUMENTS

CA 1038321 C 9/1978
CA 1311660 C 12/1992
(Continued)

OTHER PUBLICATIONS

PCT International Search Report and Written Opinion, International Filing Date Jan. 23, 2009; International Application No. PCT/CA2009/000078.

*Primary Examiner* — Gregory W Adams
(74) *Attorney, Agent, or Firm* — Scott C. Mayhew

(57) ABSTRACT

Methods and apparatus for processing eggs based upon a characteristic such as gender are provided. Material is extracted from each of a plurality of live eggs, the extracted material is assayed to identify eggs having the characteristic, and then eggs identified as having the characteristic are processed accordingly.

7 Claims, 8 Drawing Sheets

Related U.S. Application Data

(60) Provisional application No. 61/006,611, filed on Jan. 23, 2008.

(51) Int. Cl.
 *B65B 35/18* (2006.01)
 *B65G 59/02* (2006.01)

(56) References Cited

U.S. PATENT DOCUMENTS

| | | | |
|---|---|---|---|
| 3,559,371 A | 2/1971 | Borrowman | |
| 3,606,960 A | 9/1971 | Butterworth | |
| 3,696,966 A | 10/1972 | Herolzer | |
| 3,700,274 A * | 10/1972 | Paschal | B66C 1/447 294/119.1 |
| 3,763,625 A | 10/1973 | Slavin et al. | |
| 3,891,097 A | 6/1975 | Shackelford et al. | |
| 4,013,183 A * | 3/1977 | Milholen | B65G 57/035 414/794.7 |
| 4,045,073 A | 8/1977 | Mosterd | |
| 4,135,630 A | 1/1979 | Snyder et al. | |
| 4,293,272 A | 10/1981 | Jellema | |
| 4,302,142 A * | 11/1981 | Kuhl | B65B 23/08 414/416.07 |
| 4,355,936 A | 10/1982 | Thomas et al. | |
| 4,355,939 A | 10/1982 | Musgrave | |
| 4,398,499 A | 8/1983 | Blakely | |
| 4,568,231 A | 2/1986 | Czajka et al. | |
| 4,778,329 A | 10/1988 | Phillips | |
| 4,787,812 A * | 11/1988 | Gopfert | B66C 1/0212 294/188 |
| 4,894,598 A | 1/1990 | Daggett | |
| 5,007,785 A | 4/1991 | van der Schoot | |
| 5,020,001 A | 5/1991 | Yamamoto et al. | |
| 5,112,181 A * | 5/1992 | Rasmussen | B65B 23/08 294/2 |
| 5,146,871 A | 9/1992 | Havran | |
| 5,169,283 A | 12/1992 | Covert | |
| 5,975,837 A * | 11/1999 | Focke | B65G 47/90 294/119.1 |
| 6,082,080 A * | 7/2000 | Holter | B25J 15/0253 294/67.32 |
| 6,234,745 B1 | 5/2001 | Pugh et al. | |
| 6,658,816 B1 * | 12/2003 | Parker | B65G 57/005 414/2 |
| 6,866,471 B2 * | 3/2005 | Grams | B25J 15/10 414/807 |
| 7,143,567 B2 | 12/2006 | Omo et al. | |
| 2002/0131855 A1 | 9/2002 | Sonderby Kristensen et al. | |
| 2005/0053455 A1 | 3/2005 | Jaspers et al. | |
| 2005/0145643 A1 * | 7/2005 | Van den Brink | B65G 47/90 221/82 |
| 2007/0207027 A1 * | 9/2007 | Neebe | B65G 65/00 414/788 |

FOREIGN PATENT DOCUMENTS

| | | | |
|---|---|---|---|
| EP | 326422 A2 | 8/1989 | |
| EP | 1285870 A1 * | 2/2003 | B65G 47/90 |

* cited by examiner

DESTACKING AND RESTACKING OF CONTAINERS USING A ROBOT IN POULTRY HATCHERY OPERATIONS

CROSS-REFERENCE TO RELATED APPLICATIONS

This application is a continuation of U.S. application Ser. No. 12/864,264, filed Oct. 13, 2010, which was the National Stage of International Application No. PCT/CA2009/000078, filed Jan. 23, 2009, which claims the benefit of U.S. Provisional Application No. 61/006,611, filed Jan. 23, 2008, all of which are expressly incorporated herein by reference in their entirety.

TECHNICAL FIELD

The present invention relates to the use of a robot to destack and restack containers used in poultry hatchery operations. The robot has specially configured end effectors complementary to the container.

BACKGROUND OF THE INVENTION

The invention relates to improvements in container destacking and restacking operations in poultry hatcheries or the like. The invention is concerned with the handling of standardized containers, such as trays, boxes, baskets and flats used in hatchery operations by robotic means. The robot is equipped with a specially configured end effector to grasp, move, tilt, manipulate and rotate the container as may be required by any particular operation. In the prior art, various destacking and restacking operations involving containers are carried out by special purpose dedicated machines and related equipment which are eliminated by the use of a robot according to this invention.

In general terms, the term destacking refers to the step wherein a container is removed from a like stack of containers and placed on a conveyor or other surface during poultry operations. The term restacking refers to the opposite step wherein a container is removed from a conveyor or other surface and placed on a like container in a stack. In some cases a box transport dolly may be used to hold the stack of containers. In other cases a rack or buggy with shelves could be used. The term poultry hatchery operations refers to the handling and processing of eggs or newly hatched birds such as chickens, turkeys, ducks, geese, pheasant, quail, referred to herein as chicks.

To give several examples of destacking and restacking operations, live chicks are placed into containers called chick boxes which are moved by a conveyor to be vertically stacked and loaded onto a standardized box transport dolly for truck transport to the farm. A Smithway(R) dolly is one example of a suitable box transport dolly. In these operations, machine and related equipment known as a box turner, box restacker and a dolly loader is installed on the conveyor line to rotate, stack and load chick boxes onto the dolly.

The use of a robot enables the above equipment to be eliminated and all of the operations may be combined and performed by a single robot. The robot picks up the boxes from the end of the conveyor, rotates the box and stacks the box on the dolly all in one continuous motion.

In cases where two conveyor lines are used, the robot may be placed at the end between parallel conveyor lines eliminating the need to converge the conveyors into a single file upstream of the box turner, box restacker and dolly loader machines and related equipment. This simplifies and streamlines the conveyor line resulting in cost savings and minimal footprint for the equipment.

Another example relates to poultry hatchery operations that separate the live chicks from their shells. Hatch trays containing live chicks are delivered on dollies at one end of a conveyor line and are destacked by an destacking machine and placed on the conveyor for the separation step at a downstream location on the conveyor. Once the separation step is complete, the empty tray is conveyed to a washing station and finally conveyed to the end of the conveyor line. At this location, a tray restacker machine loads the empty trays onto dollies.

The use of a robot at each end of the conveyor line to destack and restack the trays eliminates the need for the specialized tray destacker and tray restacker machines and related equipment on the conveyor line. In cases, for example, where two lines are used, the use of a robot eliminates the need for two destackers and two restackers and may also eliminate the need for two dolly conveyors that feed the unloaded dolly to the end of the conveyor to be reused when the trays are restacked thereon.

Yet another example relates to egg transfer operations following, for example, vaccination. Typically the eggs are moved on the conveyor in containers called flats and must be transferred from the flats to trays which are stacked and loaded onto dollies for transport. The prior art egg transfer operations require the use of machines and related equipment known as a tray destacker, egg transfer machine, and tray restacker. All of these operations are simplified by the elimination of the above equipment by the use of a robot that destacks a tray and restacks the tray onto a dolly. In a second sequence the robot transfers the eggs into the tray. The destacking and restacking step is then repeated as required with reference to a restacked container and eggs are again transferred.

Yet another example prior to and post the vaccination process, relates to destacking and restacking flats with reference to a rack or buggy having shelves. In the prior art, destacking and restacking operations involving flat containers are carried out by special purpose dedicated machines and related equipment which are eliminated by the use of a robot according to this invention.

In most operations, the robot must be dimensionally referenced to a flat transport rack or buggy from which the containers are destacked or restacked thereon. Accordingly, a rack docking station is provided at a convenient location adjacent the robot for securing the dolly within. For these purposes, a rack is any wheeled shelved platform specially dimensioned to hold a plurality of flats stacked on shelves such as a Chickmaster Setter Rack. The docking station (not shown) is typically a tall box-like structure with a side opening to permit the entry of a rack. Once the dolly is inside the structure, hydraulic, pneumatic or electromechanical means may be used to clamp and secure the dolly in the dock with reference to a preselected reference point on the dock.

SUMMARY OF THE INVENTION

These and other objects of the invention are met by the embodiments disclosed hereafter describing the use of robotic means to destack or restack standardized containers used in poultry hatchery operations. The robotic means includes an end effector adapted to hold and move the container in three dimensions. In one embodiment of the invention, the method involves the repeating step of moving a container from a first stacked position adjacent a robot to a second destacked position. In some embodiments the container is moved from a box transport dolly to a conveyor or vice versa. In yet other embodiments the container is moved from a rack or buggy with shelves or vice versa. In some embodiments a box transport dolly is dimensionally secured against movement within a dolly docking station adjacent the robot to provide a dimensional reference for the robot.

The invention is useful to destack and restack containers such as boxes, trays or flats.

According to another embodiment, the container is moved from a first stacked position to a second stacked position to operationally permit a quantity of eggs to be transferred into the destacked container. These steps may be repeated and the next container in the stack may be destacked and restacked on the first mentioned container whereupon a quantity of eggs may again be transferred to the restacked container. These steps may be repeated as required.

In another embodiment, a dual purpose end effector is adapted to selectively and sequentially move either containers or eggs. In yet another embodiment, the containers may be destacked onto a box transport dolly which is secured against movement within a dolly docking station located adjacent a robot. In yet another embodiment, the end effector is adapted to transfer the eggs by means of a vacuum operable suction cup array.

BRIEF DESCRIPTION OF THE DRAWINGS

A better understanding of the embodiments will be obtained by reference to the accompanying drawings, wherein identical parts are identified with identical reference numbers, and wherein.

DETAILED DESCRIPTION OF PREFERRED EMBODIMENTS

Figure 1:
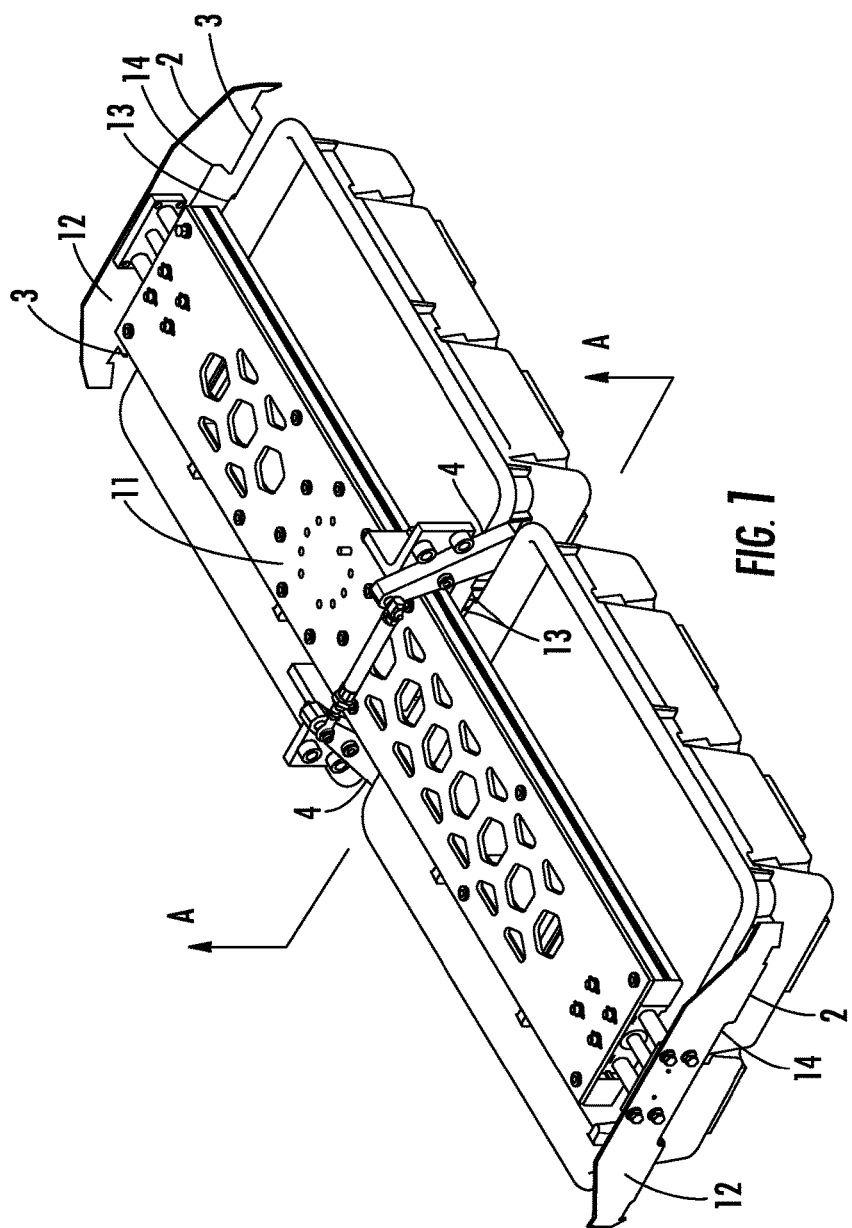
FIG. 1 is an isometric view illustrating an end effector configuration for handling a two box tandem arrangement.

Referring to FIG. 1, the end effector has a back frame 11 for attachment to the robot arm 110. The frame is sized appropriately for a particular or desired size and configuration of container. At each end of the frame, container retaining means 12 are provided which are configured to clamp and support the external surface and rim features of the particular container used. FIG. 1 illustrates two containers in a tandem end to end arrangement although other arrangements, including a single container arrangement, may be selected and used depending on the operations.

The retaining means consists of end jaws 2 which are urged inwardly to horizontally clamp the ends of the container and vertically support the outwardly protruding rim of the container by means of a pair of inwardly aligned flanges 3. In operation, the end jaws 2 move inwardly in response to electromechanical, pneumatic or hydraulic means to horizontally clamp the entire tandem arrangement and place the upper surface of the flanges 3 underneath the container rim for vertical support.

Figure 2:
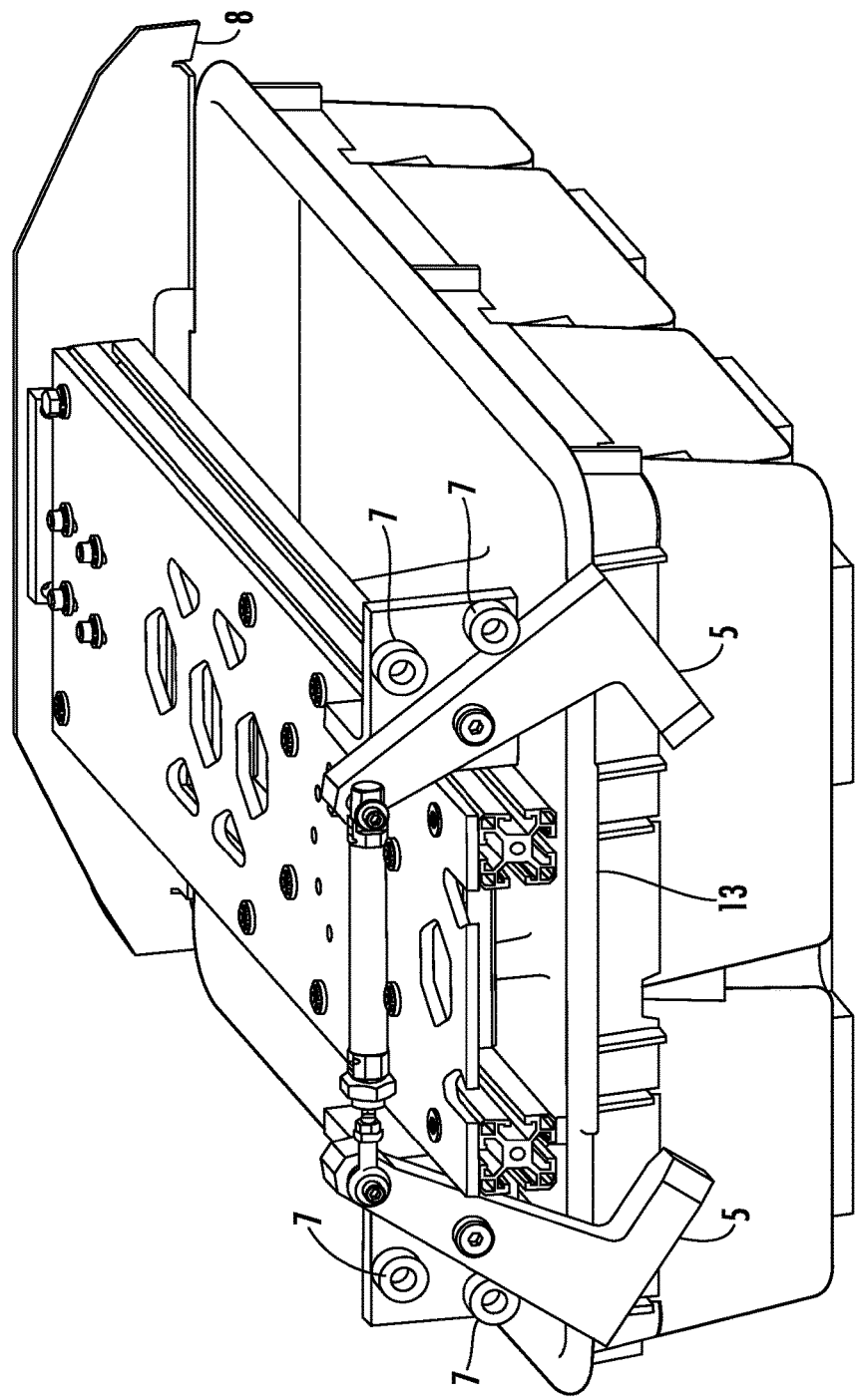
FIG. 2 is a partly sectional isometric view taken at AA in FIG. 1 illustrating the center container retaining jaws in the open position.
Figure 3:
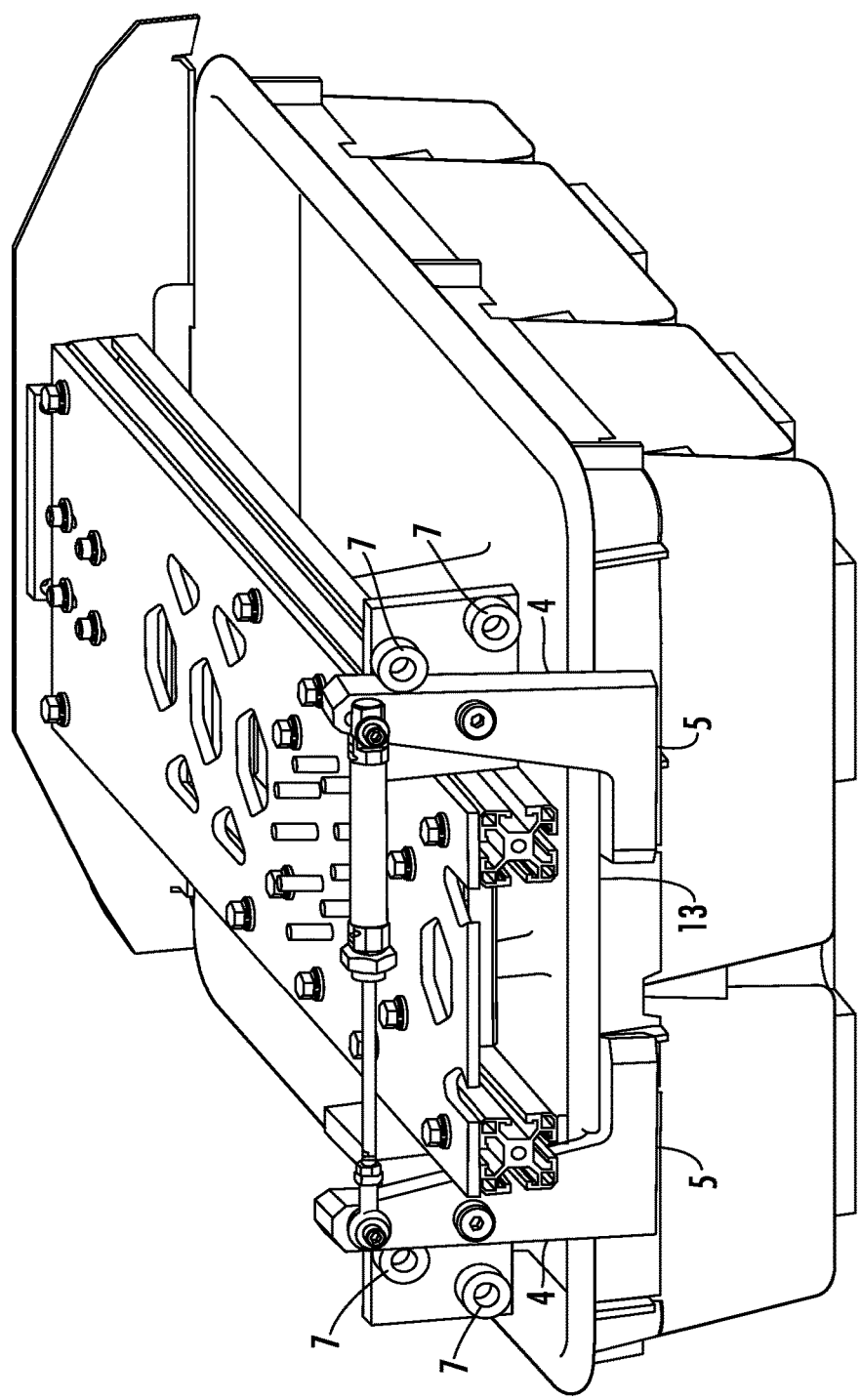
FIG. 3 is a partly sectional isometric view taken at AA in FIG. 1 illustrating the center retaining jaws in the closed position.

The inside handles 13 of the container are supported by a pair of pivoting jaws 4. The pivoting jaws 4 have a thickness which create a space between the adjacent ends of the containers to thereby separate the container ends of the tandem arrangement. The handles 13 are supported underneath by a pair of pivoting jaws 4 having legs 5 that rotate inwardly to engage the underside of the inside handles 13 as shown in FIG. 2. Conventional stops 7 are provided to limit the movement of the arms. In order to align the container more precisely with the references to the back frame of the end effector, corner guides 8 are provided to positively urge and move the container into a centered reference position underneath the frame. Further, the end jaws 2 have shaped recesses 14 complementary to the handle which seat or nest thereon to help align the container with reference thereto.

Figure 4:
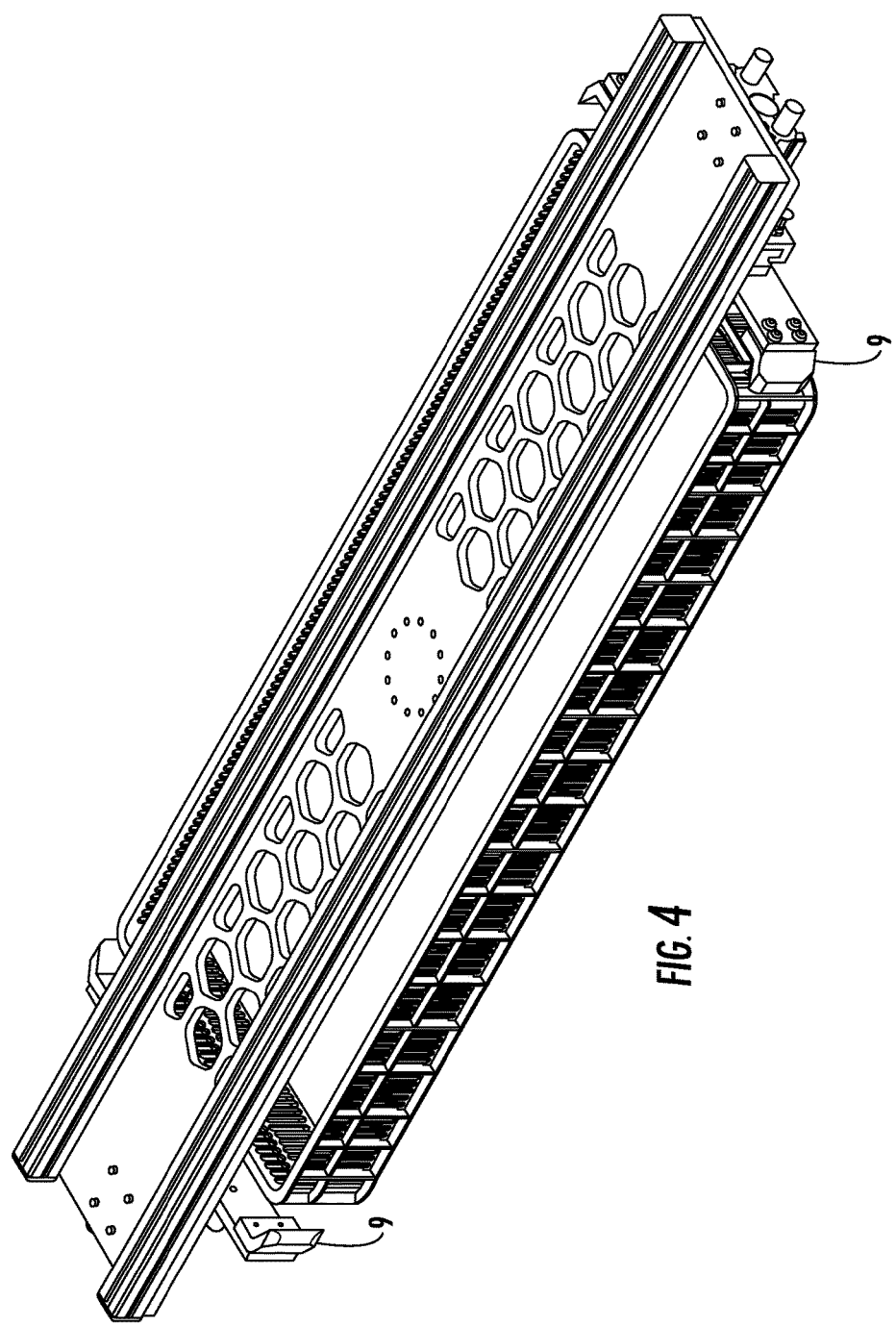
FIG. 4 is an isometric view illustrating a different end effector configuration for handling a tray.
Figure 5:
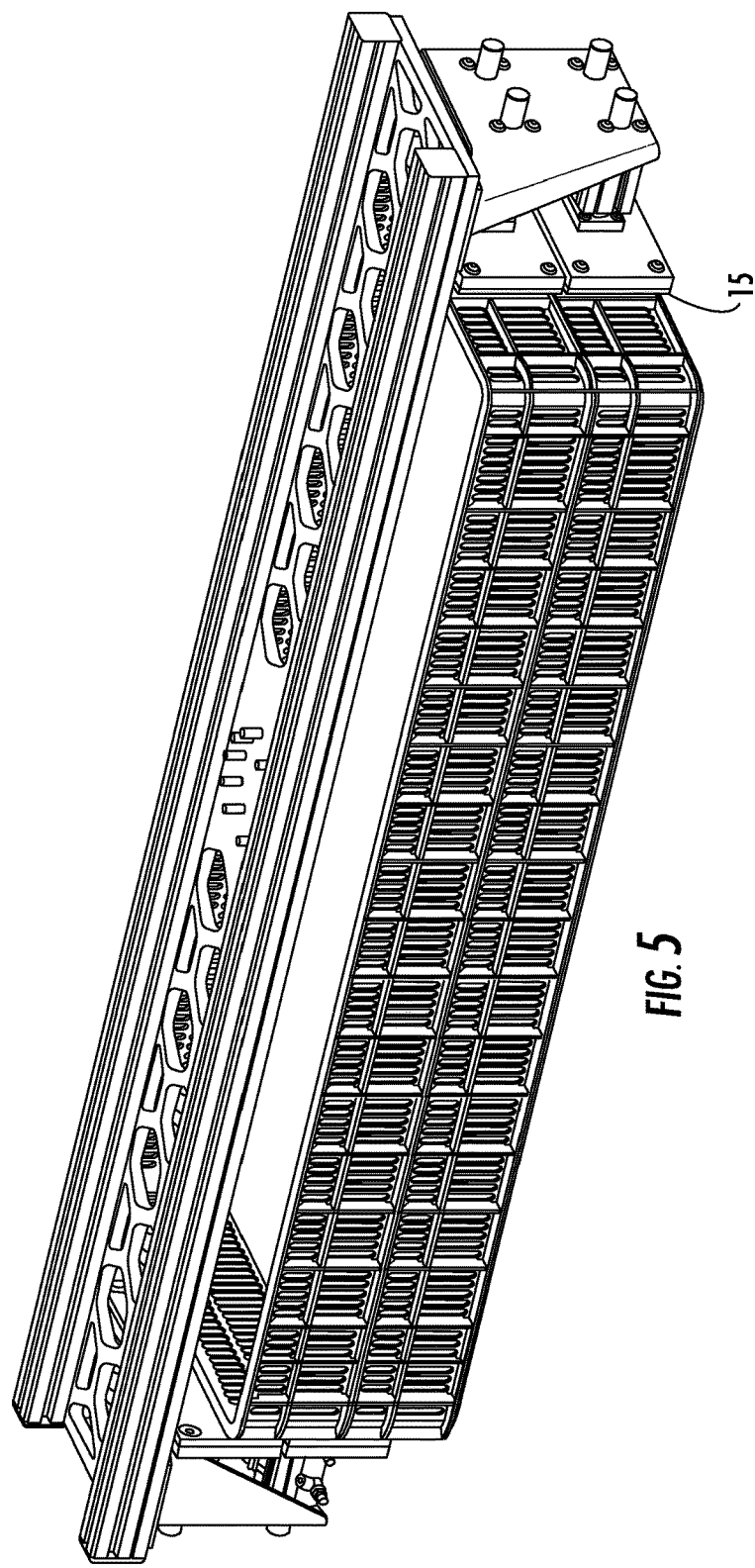
FIG. 5 is an isometric view and illustrates yet another end effector configuration for handling a two stacked tray arrangement.

FIG. 4 illustrates a different configuration for an end effector which operates to clamp the end arms against the end surfaces of the container. Corner guides 9 are provided in cases where alignment of the container with reference to the frame of the end effector is required. In cases where precise alignment is not required in, for example, a destacking operation, clamping faces having a rubberized or other gripping surface 15 without corner guides may be used as shown in FIG. 5. FIG. 5 additionally illustrates an end effector configuration for simultaneously clamping two vertically stacked trays.

Figure 6:
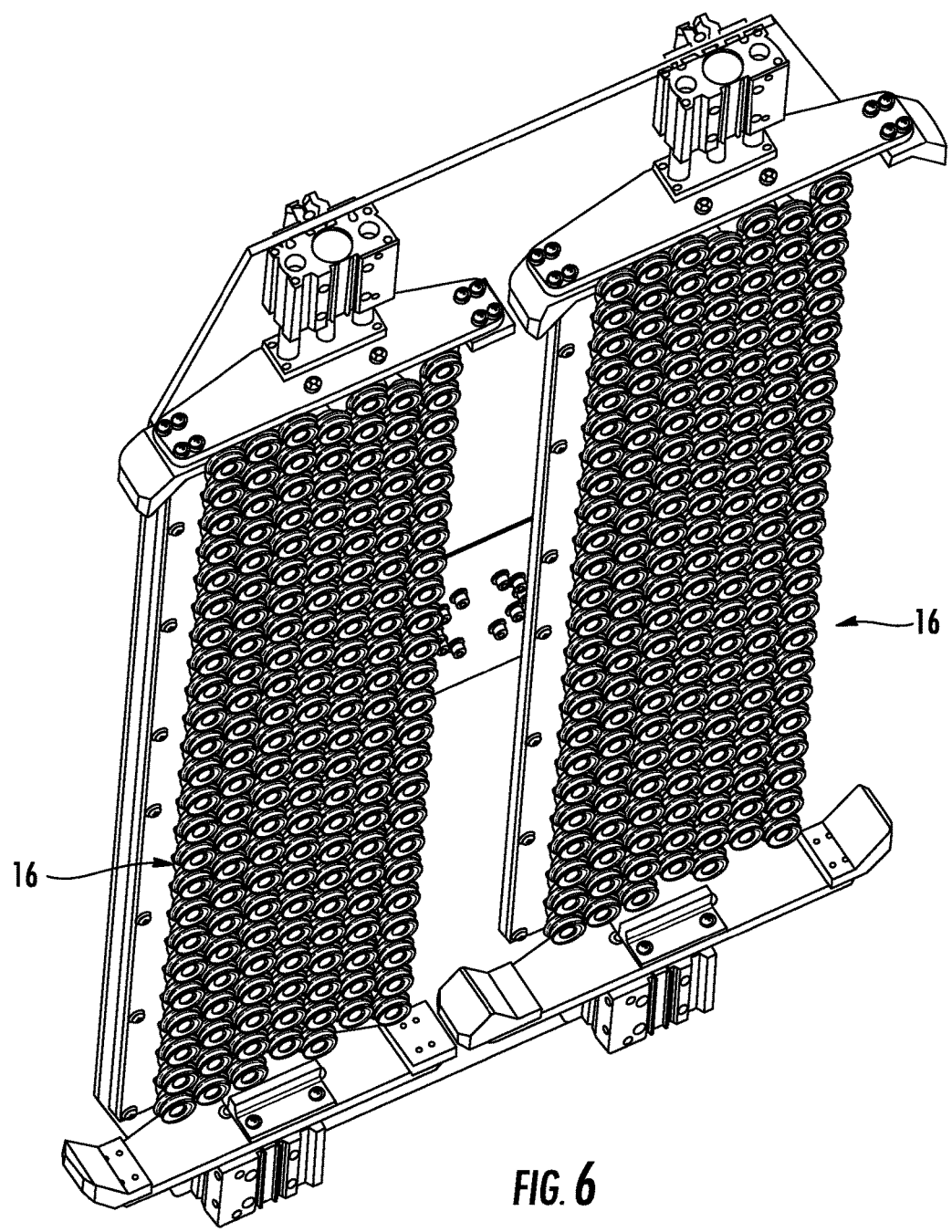
FIG. 6 is an isometric view illustrating the underside of a dual purpose end effector for handling trays and eggs.

Referring to FIG. 6, a dual purpose end effector is shown having container clamping means similar to that shown in FIG. 4. An array of suction cups 16 is additionally provided to transfer the eggs. In operation, this dual purpose end effector is used to destack a tray and place it on a dolly in position to receive the eggs as the first step. The second step involves using the suction cup array feature on the end effector to grasp and take away a quantity of eggs from a standard flat arranged in complementary fashion to the suction cup array. The eggs are transferred into the destacked tray on the dolly. This step is repeated by destacking a second tray and placing it on top of the first mentioned tray for receiving a second batch of eggs and so on.

Referring to FIG. 6, the end effector shown is optionally configured to destack two trays at a time and take away and load two batches of eggs at a time into the destacked trays having regard to the above described single egg transfer operation.

Figure 8:
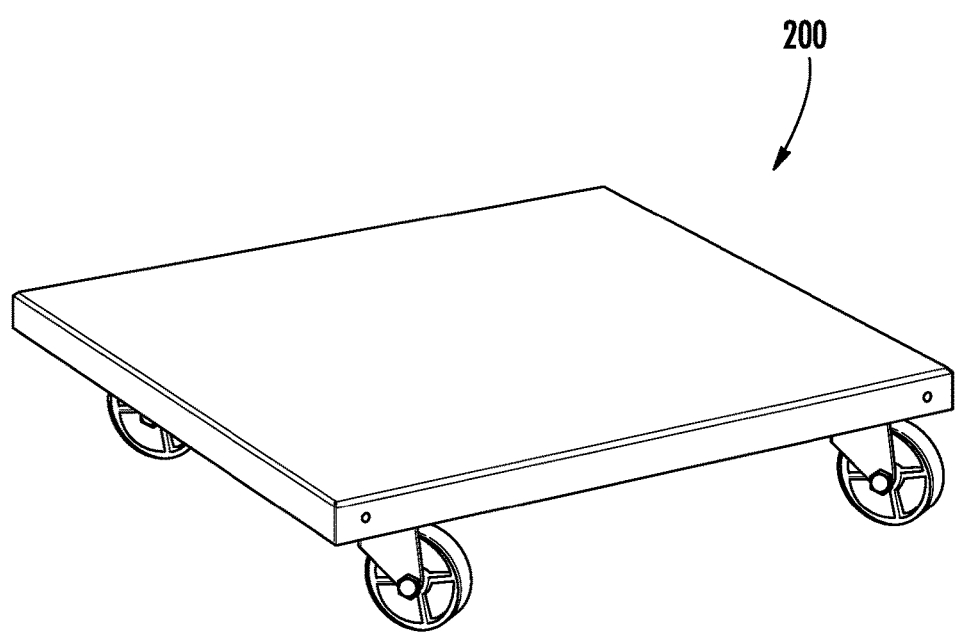
FIG. 8 is a perspective schematic view of a box transport dolly capable of use in connection with aspects of the present disclosure.

In most operations, the robot must be dimensionally referenced to a box transport dolly 200 (FIG. 8) from which the containers are destacked or restacked thereon. Accordingly, a dolly docking station is provided at a convenient location adjacent the robot for securing the dolly 200 within. For these purposes, a dolly is any wheeled platform specially dimensioned to hold a plurality of stacked or stackable containers such as a Smithway dolly. The docking station (not shown) is typically a low box-like structure with a side opening to permit the entry of a dolly. Once the dolly is inside the structure, hydraulic, pneumatic or electromechanical means may be used to clamp and secure the dolly in the dock with reference to a preselected reference point on the dock.

The use of conveyors to destack and restack containers in hatchery operations advantageously serves to increase the speed and accuracy of these operations resulting in reduced capital and operating costs and increased production rates. The use of a robot adds flexibility by enabling the installed robotic equipment to handle containers of different sizes and configurations thus creating opportunity for integration with existing equipment. As well, less floor space or equipment footprint is required enabling reduced construction costs and permitting retrofitting in existing facilities. Finally, the robot eliminates a multiplicity of prior art equipment thereby resulting in savings of cost, maintenance and increasing reliability.

Figure 7:
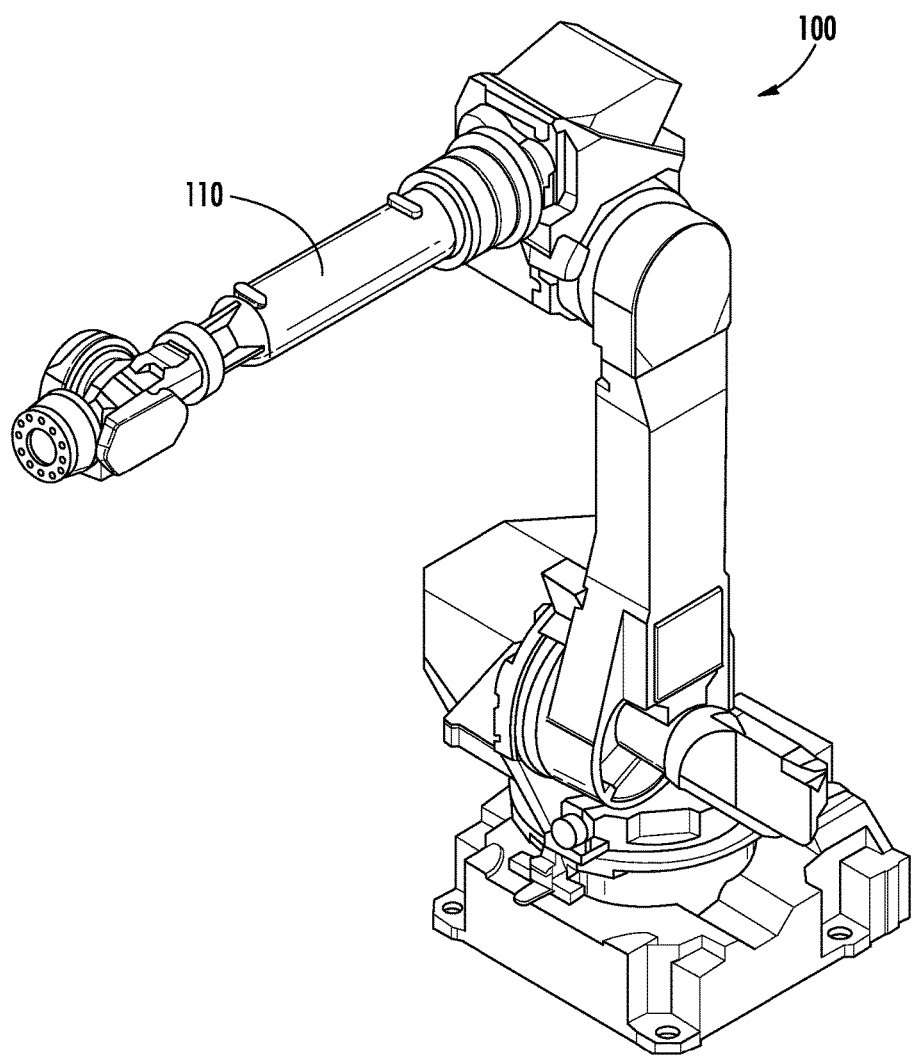
FIG. 7 is a perspective schematic view of a multi-axis robot and associated arm capable of implementation in accordance with the present disclosure.

Referring to FIG. 7, the robot used for these destacking and restacking operations is a multi-axis robot 100 such as, for example, FANUC® M710iC-50/70, equipped with a specialized end effector to grasp, grip, tilt, rotate or otherwise manipulate the container as may be required by a particular operation requiring the destacking and restacking of containers on the conveyor line. As is well known, the end effector may operate hydraulically, electromechanically or pneumatically.

Further advantages which are inherent to the invention are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

That which is claimed:

1. An apparatus used in poultry hatchery operations, the apparatus comprising:
   a multi-axis robot arm;
   an end effector operably engaged with the multi-axis robot arm and configured to hold and move a standardized container in three dimensions, the end effector having a frame and non-hinged end jaws at each end of the frame and having container retaining structures configured to move inwardly to horizontally clamp opposite ends of a standardized container upon actuation thereof, the non-hinged end jaws each comprise a pair of inwardly aligned flanges extending perpendicular from the container retaining structures and configured to support the standardized container, the end effector further having a pair of corner guides fixed to each non-hinged end jaw, the corner guides being configured to align the standardized container with reference to the frame; and
   wherein the end effector is configured to be capable of performing acts in which:
      eggs are removed from an egg flat by the end effector;
      the external surface of the standardized container is clamped and supported by the end effector;
      the standardized container is moved from a first stacked position to a second destacked position; and
      the eggs are transferred from the end effector into the destacked standardized container.

2. The apparatus of claim 1, wherein the end effector has opposing clamping faces having a gripping surface.

3. The apparatus of claim 1, wherein the end effector has an array of suction cups configured to grasp and transport eggs.

4. The apparatus of claim 1, wherein the end effector is configured to receive and handle multiple vertically-stacked standardized containers.

5. The apparatus of claim 1, wherein the end effector is configured to receive and handle multiple horizontally-adjacent standardized containers.

6. The apparatus of claim 1, wherein the end effector is dual purposely configured to selectively and alternatively destack and restack a container and transfer the eggs.

7. The apparatus of claim 1, wherein the end effector further comprises a pair of pivoting jaws attached to the frame and disposed between the non-hinged end jaws.

\* \* \* \* \*